(12) United States Patent
Morlando

(10) Patent No.: US 10,142,289 B1
(45) Date of Patent: Nov. 27, 2018

(54) SECURE INTERFACE FOR A MOBILE COMMUNICATIONS DEVICE

(71) Applicant: Owl Cyber Defense Solutions, LLC, Ridgefield, CT (US)

(72) Inventor: Salvatore Morlando, Easton, CT (US)

(73) Assignee: Owl Cyber Defense Solutions, LLC, Ridgefield, CT (US)

( * ) Notice: Subject to any disclaimer, the term of this patent is extended or adjusted under 35 U.S.C. 154(b) by 0 days.

(21) Appl. No.: 15/937,767

(22) Filed: Mar. 27, 2018

(51) Int. Cl.
*H04W 12/10* (2009.01)
*H04L 29/06* (2006.01)
*H04M 1/725* (2006.01)

(52) U.S. Cl.
CPC ........ *H04L 63/0245* (2013.01); *H04L 63/145* (2013.01); *H04M 1/72527* (2013.01); *H04W 12/10* (2013.01)

(58) Field of Classification Search
CPC ........ H04W 12/06; H04L 63/10; H04L 63/12; H04L 63/029; H04L 67/025
See application file for complete search history.

(56) References Cited

U.S. PATENT DOCUMENTS

| | | | |
|---|---|---|---|
| 5,623,601 A * | 4/1997 | Vu ........................ | H04L 29/06 726/12 |
| 5,703,562 A | 12/1997 | Nilsen | |
| 7,675,867 B1 | 3/2010 | Mraz et al. | |
| 7,941,526 B1 | 5/2011 | Hope et al. | |
| 7,992,209 B1 | 8/2011 | Menoher et al. | |
| 8,068,415 B2 | 11/2011 | Mraz | |
| 8,139,581 B1 | 3/2012 | Mraz et al. | |
| 8,266,689 B2 | 9/2012 | Menoher et al. | |
| 8,352,450 B1 | 1/2013 | Mraz et al. | |
| 8,353,022 B1 | 1/2013 | Menoher et al. | |
| 8,498,206 B2 | 7/2013 | Mraz | |
| 8,516,580 B2 | 8/2013 | Menoher | |
| 8,565,237 B2 | 10/2013 | Mraz et al. | |
| 8,646,094 B2 | 2/2014 | Staubly | |
| 8,732,453 B2 | 5/2014 | Mraz et al. | |
| 8,776,254 B1 | 7/2014 | Mraz et al. | |

(Continued)

*Primary Examiner* — Diane Mizrahi
(74) *Attorney, Agent, or Firm* — Economou Silfin LLP; John S. Economou

(57) ABSTRACT

A secure interface for a mobile communications device has output communications circuitry operable to communicate with an external network, private network communications circuitry operable to communicate with a mobile communications device, and an input/output filter connected between the output communications circuitry and the private network communications circuitry. The input/output filter separately filters, based on programmed stored criteria, externally-received information packets from the external network via the output communications circuitry and internally-received information packets from the mobile communications device via the private network communications circuitry. The input/output filter passes the filtered externally-received information packets to an internal connection of the private network communications circuitry for transmission to the mobile communications device and passes the filtered internally-received information packets to an internal connection of the output communications circuitry for transmission to the external network.

20 Claims, 5 Drawing Sheets

(56) References Cited

U.S. PATENT DOCUMENTS

| | | | |
|---|---|---|---|
| 8,831,222 B2 | 9/2014 | Menoher et al. |
| 8,887,276 B2 | 11/2014 | Mraz et al. |
| 8,898,227 B1 | 11/2014 | Mraz et al. |
| 8,938,795 B2 | 1/2015 | Clarke et al. |
| 8,997,202 B2 | 3/2015 | Curry et al. |
| 9,065,878 B2 | 6/2015 | Curry et al. |
| 9,081,520 B2 | 7/2015 | Mraz et al. |
| 9,088,539 B2 | 7/2015 | Mraz et al. |
| 9,088,558 B2 | 7/2015 | Curry et al. |
| 9,094,401 B2 | 7/2015 | Mraz |
| 9,160,834 B2 | 10/2015 | Yarger et al. |
| 9,282,102 B2 | 3/2016 | Mraz |
| 9,305,189 B2 | 4/2016 | Mraz et al. |
| 9,306,953 B2 | 4/2016 | Mraz et al. |
| 9,311,329 B2 | 4/2016 | Mraz et al. |
| 9,380,023 B2 | 6/2016 | Mraz et al. |
| 9,380,064 B2 | 6/2016 | Mraz et al. |
| 9,436,825 B2 | 9/2016 | Mraz et al. |
| 9,575,987 B2 | 2/2017 | Mraz et al. |
| 9,596,245 B2 | 3/2017 | Mraz et al. |
| 9,641,499 B2 | 5/2017 | Currey et al. |
| 9,678,921 B2 | 6/2017 | Clarke et al. |
| 9,680,794 B2 | 6/2017 | Curry et al. |
| 9,712,543 B2 | 7/2017 | Mraz et al. |
| 9,736,121 B2 | 8/2017 | Mraz et al. |
| 9,853,918 B2 | 12/2017 | Mraz et al. |
| 9,880,869 B2 | 1/2018 | Mraz et al. |
| 9,894,083 B2 | 2/2018 | Mraz et al. |
| 2006/0224887 A1 | 10/2006 | Vesikivi et al. |
| 2006/0293057 A1 | 12/2006 | Mazerski et al. |
| 2008/0301798 A1* | 12/2008 | Hao ............... H04L 43/00 726/13 |
| 2012/0030768 A1 | 2/2012 | Mraz et al. |
| 2012/0162697 A1 | 6/2012 | Mraz et al. |
| 2012/0231764 A1 | 9/2012 | Lindteigen et al. |
| 2012/0304290 A1 | 11/2012 | McPhail |
| 2012/0317617 A1 | 12/2012 | Hart et al. |
| 2013/0040607 A1 | 2/2013 | Lindteigen et al. |
| 2013/0094485 A1 | 4/2013 | Jiang et al. |
| 2013/0157645 A1 | 6/2013 | Hart et al. |
| 2013/0254878 A1 | 9/2013 | Mraz et al. |
| 2013/0303146 A1 | 11/2013 | Van Voorhees et al. |
| 2014/0020109 A1 | 1/2014 | Mraz et al. |
| 2014/0089388 A1 | 3/2014 | Curry et al. |
| 2014/0136657 A1 | 5/2014 | Mraz |
| 2014/0139737 A1 | 5/2014 | Clarke et al. |
| 2014/0165182 A1 | 6/2014 | Curry et al. |
| 2014/0207939 A1 | 7/2014 | Mraz et al. |
| 2014/0208420 A1 | 7/2014 | Mraz et al. |
| 2014/0237372 A1 | 8/2014 | Mraz et al. |
| 2014/0237561 A1 | 8/2014 | Mraz |
| 2014/0304371 A1 | 10/2014 | Mraz et al. |
| 2014/0337410 A1 | 11/2014 | Mraz et al. |
| 2015/0020155 A1 | 1/2015 | Curry et al. |
| 2015/0020194 A1 | 1/2015 | Mraz et al. |
| 2015/0026792 A1 | 1/2015 | Mraz et al. |
| 2015/0059395 A1 | 2/2015 | Mraz et al. |
| 2015/0067104 A1 | 3/2015 | Curry et al. |
| 2015/0278520 A1 | 10/2015 | Mraz et al. |
| 2015/0370826 A1 | 12/2015 | Mraz et al. |
| 2016/0269396 A1 | 9/2016 | Ren et al. |
| 2017/0078429 A1 | 3/2017 | Toussaint et al. |
| 2017/0155682 A1* | 6/2017 | Touboul ............... H04L 63/20 |
| 2017/0293776 A1 | 10/2017 | Bolignano |
| 2017/0302625 A1 | 10/2017 | Mraz et al. |
| 2017/0338559 A1 | 11/2017 | Cheikh et al. |

* cited by examiner

SECURE INTERFACE FOR A MOBILE COMMUNICATIONS DEVICE

FIELD

This disclosure relates generally to a secure interface for a smartphone, and more particularly to a secure interface that monitors all incoming and outgoing information to identify and block the transmission and/or receipt of malware, confidential information, or other types of information that should not be received by and/or transmitted from the mobile communications device.

BACKGROUND

Mobile malware is malicious software that targets mobile communications devices by disrupting the device's operating system and/or causing the loss or leakage of confidential information stored on the mobile communications device. As mobile communications devices such as smartphones or wireless-enabled tablets have become more common and more complex, it has become increasingly difficult to protect against electronic attacks in the form of viruses or other malware.

Accordingly, there is a need for a secure interface for a mobile communications device which monitors the information received by or transmitted from a mobile communications device to protect against malware infections and the consequent damage that could result from any such infection.

SUMMARY

In a first aspect, a secure interface for a mobile communications device has output communications circuitry, private network communications circuitry, and an input/output filter. The output communications circuitry is operable to communicate output communications with an external network. The output communications includes externally-received information packets and to be externally-transmitted information packets. The output communications circuitry receives the to be externally-transmitted information packets via an internal connection and transmits the to be externally-transmitted information packets to the external network via an external connection and receives the externally-received information packets from the external network via the external connection and passes the externally-received information packets via the internal connection. The private network communications circuitry is operable to communicate private network communications with a mobile communications device. The private network communications includes internally-received information packets and to be internally-transmitted information packets. The private network communications circuitry receives the to be internally-transmitted information packets via an internal connection and transmits the to be internally-transmitted information packets to the mobile communications device via an external connection and receives the internally-received information packets from the mobile communications device via the external connection and passes the internally-received information packets via the internal connection. The input/output filter is connected between the output communications circuitry and the private network communications circuitry and is configured to separately filter, based on programmed stored criteria, the externally-received information packets and the internally-received information packets, to pass filtered externally-received information packets to the internal connection of the private network communications circuitry as the to be internally-transmitted information packets, and to pass filtered internally-received information packets to the internal connection of the output communications circuitry as the to be externally transmitted information packets.

In a further aspect, the output communications circuitry may have mobile network circuitry and a communications controller. In another further aspect, the output communications circuitry may have Wi-Fi circuitry and a communications controller and the communications controller may store configuration settings for the Wi-Fi circuitry. In yet another further aspect, the output communications circuitry may have mobile network circuitry, Wi-Fi circuitry, and a communications controller and the communications controller may be configured to select one of the mobile network circuitry and Wi-Fi circuitry for use.

In another further aspect, the input/output filter may have an input path one-way link configured to pass information packets from an input thereof to an output thereof and to prevent any information or signals of any kind from passing from the output thereof to the input thereof, and an output path one-way link configured to pass information packets from an input thereof to an output thereof and to prevent any information or signals of any kind from passing from the output thereof to the input thereof.

In yet another further aspect, the input/output filter may have an output server/filter having an output coupled to the input of the input path one-way link and an input coupled to the output of the output path one-way link. The output server/filter may be configured to forward information packets received on the input thereof to the output communications circuitry, to filter information packets received from the output communications circuitry based on first programmed stored criteria and to forward the filtered information packets on the output thereof. The input/output filter may have an input server/filter having an input coupled to the output of the input path one-way link and an output coupled to the input of the output path one-way link. The input server/filter may be configured to forward information packets received on the input thereof to the private network communications circuitry, to filter information packets received from the private network communications circuitry based on second programmed stored criteria and to forward the filtered information packets on the output thereof. The output server/filter may only receive information packets from the input server/filter via the output path one-way link. The input server/filter may only receive information packets from the output server/filter via the input path one-way link. The input/output filter may have a firewall having a first connection to the output communications circuitry and a second connection to the private network communications circuitry. The firewall may be configured to filter information packets received from the output communications circuitry based on first programmed stored criteria and to forward filtered information packets to the private network communications circuitry and to filter information packets received from the private network communications circuitry based on second programmed stored criteria and to forward the filtered information packets to the output communications circuitry.

In still further aspects, a settings controller may be operable to set programmed stored criteria and settings for the output communications circuitry and for the input/output filter. The private network communications circuitry may have circuits operable to communicate according to a secure personal network protocol. The private network communications circuitry may have circuits operable to communicate according to an Institute of Electrical and Electronics Engineers (IEEE) 802 standard. The private network communications circuitry may implement encrypted communications. The mobile communications device may a smartphone and the output communications circuitry, the private network communications circuitry, and the input/output filter may be mounted within a clam-shell type case that mates with the smartphone. The output communications circuitry, the private network communications circuitry, and the input/output filter may be mounted within an enclosure separate from the mobile communications device.

In a second aspect, a method provides a secure interface for a mobile communications device. A mobile communications device is configured to disable communications with an external network and enabling communications with a private network. The mobile communications device is communicatively connected the to a private network generated by the secure interface. The secure interface is communicatively connected the to the external network. The criteria for inbound data packet filtering is set. Inbound data packets are received via the external network. The inbound data packets are filtered. The filtered inbound data packets are passed to the mobile communications device via the private network.

In a further aspect, criteria for outbound packet filtering may be set. Outbound data packets from the mobile communications device may be received via the private network. The outbound data packets may be filtered. The filtered outbound data packets may be passed to the external network.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The following detailed description, given by way of example and not intended to limit the present disclosure solely thereto, will best be understood in conjunction with the accompanying drawings in which.

DETAILED DESCRIPTION

In the present disclosure, like reference numbers refer to like elements throughout the drawings, which illustrate various exemplary embodiments of the present disclosure.

Figure 1:
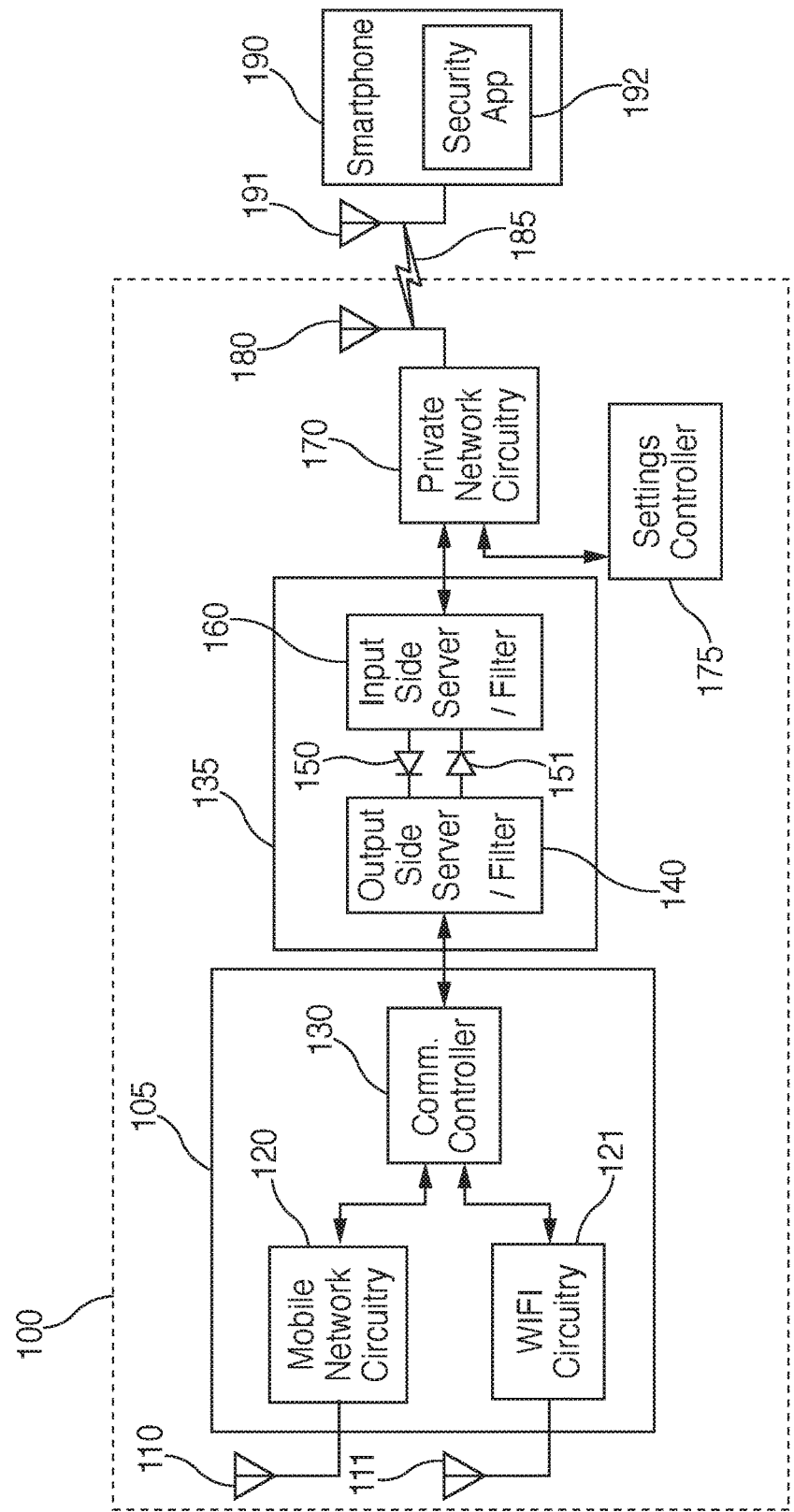
FIG. 1 is a block diagram of a first embodiment of a secure interface for a mobile communications device according to an aspect of the present disclosure.

Referring now to the drawings and in particular to FIG. 1, a first embodiment of a secure interface 100 for use with a mobile communications device such as smartphone 190 includes output communications circuitry 105 for communications with one or more external networks. Output communications circuitry 105 preferably includes mobile network circuitry 120 and an associated mobile network antenna 110 for communication with a commercial mobile (cellular) network and Wi-Fi circuitry 121 and an associated Wi-Fi antenna 111 for communication with a wireless local area network that is also connected to the Internet. Mobile network circuitry 120 includes a transmitter/receiver for converting information between radio frequency (RF) levels and baseband levels as appropriate for a particular commercial mobile network, power amplifier, a subscriber identity module (SIM) card provided by the particular commercial mobile network, etc. Wi-Fi circuitry 121 includes a transmitter/receiver for converting information between radio frequency (RF) levels and baseband levels as appropriate for a particular wireless local area network, power amplifier, etc. In a presently preferred embodiment, output communications circuitry 105 includes both mobile network circuitry 120 (and the associated mobile network antenna 110) and Wi-Fi circuitry 121 (and the associated Wi-Fi antenna 111), with either the mobile network circuitry 120 or the Wi-Fi circuitry 121 or both selected for use in current configuration settings. In one alternative embodiment, output communications circuitry 105 includes only the mobile network circuitry 120 (and the associated mobile network antenna 110). In another alternative embodiment, output communications circuitry 105 includes only the Wi-Fi circuitry 121 (and the associated Wi-Fi antenna 111). When the secure interface 100 is used with the mobile network circuitry 120 enabled, all of the identity information for the associated smartphone 190 remains hidden to outside networks. The only identifying information passed to the outside commercial mobile (cellular) network is information in the SIM card associated with mobile network circuitry 120, because, as discussed below, identifying information from smartphone 190 (including information from the SIM card installed therein) is stripped out by the protocol break implemented by the output path one-way link 150).

A communications controller 130 is coupled to both the mobile network circuitry 120 and the Wi-Fi circuitry 121 in the preferred embodiment (or only to the mobile network circuitry 120 or the Wi-Fi circuitry 121 in the respective alternative embodiments mentioned above) for managing the transmission and receipt of information selectively via the mobile network circuitry 120 and/or the Wi-Fi circuitry 121, as defined in the current configuration settings. Communications controller 130 also manages settings for Wi-Fi circuitry 121. The communications controller 130 is also coupled to an output-side server/filter 140 that is part of an input/output filter 135.

Input/output filter 135 includes output-side server/filter 140, output path one-way link 150, input path one-way link 151, and input-side server/filter 160. The output-side server/filter 140 is coupled to an output of the output path one-way link 150 and to an input of the input path one-way link 151. The input of the output path one-way link 150 and the output of the input path one-way link 151 are both connected to the input-side server/filter 160 (discussed below). The output-side server/filter 140 receives information packets (received data—inbound data packets) from communications controller 130 and filters such information packets, based on programmed stored criteria (the in-bound filter criteria), to block any received undesirable information (e.g., malware) from passing to the input of the input path one-way link 151. The filter criteria may be based on one or more of: data type, data content (e.g., malware), whitelist internet protocol (IP)

addresses (i.e., only receive information from and/or transmit information to listed IP addresses), blacklist IP addresses (i.e., block all information from and/or to be transmitted to listed IP addresses), whitelist phone numbers (i.e., only receive and/or transmit calls/text messages from listed IP addresses), blacklist phone numbers (i.e., block received and/or output calls/text messages from listed IP addresses).

Input path one-way link 151 may be a hardware-based one-way link with no return path which includes, for example, a light emitting diode (LED) coupled to a first end of an optical pathway (e.g., an optical fiber), and photodiode coupled to a second end of the optical pathway or may be a virtual one-way link formed by a custom integrated circuit (e.g., a first-in first-out register implemented in a gate array circuit). Input path one-way link 151 allows information to pass from an input thereof to an output thereof and prevents any information or signals of any kind from passing from the output thereof to the input thereof. Input path one-way link 151 may provide a protocol break by removing any source-related information (e.g., origination IP address or MAC address) before passing the information across the optical pathway. The output-side server/filter 140 also receives information packets (data for transmission—outbound data packets) from an output of the output path one-way link 150 and forwards such information to communications controller 130 for transmission via either the mobile network circuitry 120 or the Wi-Fi circuitry 121 (depending on the embodiment or current configuration settings). Output path one-way link 150 may be a hardware-based one-way link with no return path which includes, for example, a light emitting diode (LED) coupled to a first end of an optical pathway (e.g., an optical fiber), and photodiode coupled to a second end of the optical pathway or may be a virtual one-way link formed by a custom integrated circuit (e.g., a first-in first-out register implemented in a gate array circuit). Output path one-way link 150 allows information to pass from an input thereof to an output thereof and prevents any information or signals of any kind from passing from the output thereof to the input thereof. Output path one-way link 150 may provide a protocol break by removing any source-related information (e.g., origination IP address or MAC address) before passing the information across the optical pathway. By connecting input-side server/filter 160 to output-side server/filter only via output path one-way link 150 and input path one-way link 151, with no other connections there between, it can be ensured that all externally-received data packets are filtered before being passed across input path one-way link 151 and all internally-received data packets are filtered before being passed across output path one-way link 15.

The input-side server/filter 160 is also coupled to private network communications circuitry 170. The input-side server/filter 160 receives information (filtered received data packets) from the output of the input path one-way link 151 and forwards such information to private network communications circuitry 170. In addition, the input-side server/filter 160 receives information for transmission (to be externally transmitted data packets) from the private network communications circuitry 170 and filters such information, based on programmed stored criteria (the out-bound filter criteria), to block any received undesirable information (e.g., malware) from passing to the input of the output path one-way link 150. The filter criteria may be based on one or more of: data type, data content (e.g., malware), whitelist IP addresses (i.e., only receive information from listed IP addresses), blacklist IP addresses (i.e., block all information from listed IP addresses), whitelist phone numbers (i.e., only receive and/or transmit calls/text messages from listed IP addresses), blacklist phone numbers (i.e., block received and/or output calls/text messages from listed IP addresses).

The private network communications circuitry 170 includes a controller and associated circuitry for transmitting and receiving information via antenna 180 over a private network 185 (including, for example, circuitry to convert information between baseband and RF levels, a transmitter, a receiver and a power amplifier). Private network 185 is preferably a wireless local area network based on one of the various Institute of Electrical and Electronics Engineers (IEEE) 802 standards, for example, with strong levels of encryption implemented or may be a secure personal area network based on one of the following protocols: INSTEON®, Infrared Data Association (IrDA), Wireless Universal Serial Bus (USB), Bluetooth®, Z-Wave, or ZigBee®.

In operation, the output communications circuitry 105 receives to be externally-transmitted information packets via an internal connection (i.e., the connection between communications controller 130 and output-side server/filter 140) and transmits the to be externally-transmitted information packets to the external network via an external connection (e.g., mobile network antenna 110 or Wi-Fi antenna 111). In addition, the output communications circuitry 105 receives externally-received information packets from the external network via the external connection (i.e., mobile network antenna 110 or Wi-Fi antenna 111) and passes the externally-received information packets via the internal connection (i.e., the connection to the output-side server/filter 140). In addition, private network communications circuitry 170 receives the to be internally-transmitted information packets via an internal connection (i.e., the connection between private network communications circuitry 170 and input-side server/filter 160) and transmits the to be internally-transmitted information packets to the mobile communications device (e.g., smartphone 190) via an external connection (e.g., antenna 180). In addition, private network communications circuitry 170 receives the internally-received information packets from the mobile communications device via the external connection (e.g., antenna 180) and passes the internally-received information packets via the internal connection to the input-side server/filter 160 that is part of input/output filter 135. Input/output filter 135 passes the filtered externally-received information packets to the internal connection of private network communications circuitry 170 as the to be internally-transmitted information packets, and passes the filtered internally-received information packets to the internal connection of the output communications circuitry 105 as the to be externally-transmitted information packets.

A settings controller 175 is also coupled to private network communications circuitry 170. Settings controller 175 receives settings information received from smartphone 190 for defining the in-bound filter criteria and the out-bound filter criteria, and, if required, selecting the output of (e.g., mobile network circuitry 120 or Wi-Fi circuitry 121) and defining the criteria (e.g., Wi-Fi circuitry settings) for output communications circuitry 105. Settings controller 175 is coupled to communications controller 130 and to input/output filter 135 so that the settings information may be provided to and stored therein.

Smartphone 190 includes an antenna 191 for communicating with secure interface 100 via the private network 185. Smartphone 190 includes a security application 192 for configuring the operation of secure interface 100, including selecting the type of output signal (i.e., mobile network or Wi-Fi), setting criteria for the output communications circuitry operation, and setting the in-bound filter criteria and out-bound filter criteria. In particular, security application 192 is configured to transmit information that passes directly to settings controller 175 to implement the various configuration criteria. As discussed below, in operation, smartphone 190 is set into airplane mode to disable any communications via the mobile network and is configured to only communicate via the appropriate private network interface (e.g., Wi-Fi). In this manner, all received data packets are filtered before being transmitted to smartphone 190 and all data packets for transmission from smartphone 190 are filtered before being transmitted via the mobile network or the Wi-Fi network. As one of ordinary skill in the art will readily recognize, private network 185 is a secure network which only allows communications between secure interface 100 and smartphone 190 (and no other client or server) and is different from the Wi-Fi-based local area network coupled to the Internet which is discussed with respect to Wi-Fi circuitry 121 above.

Figure 2:
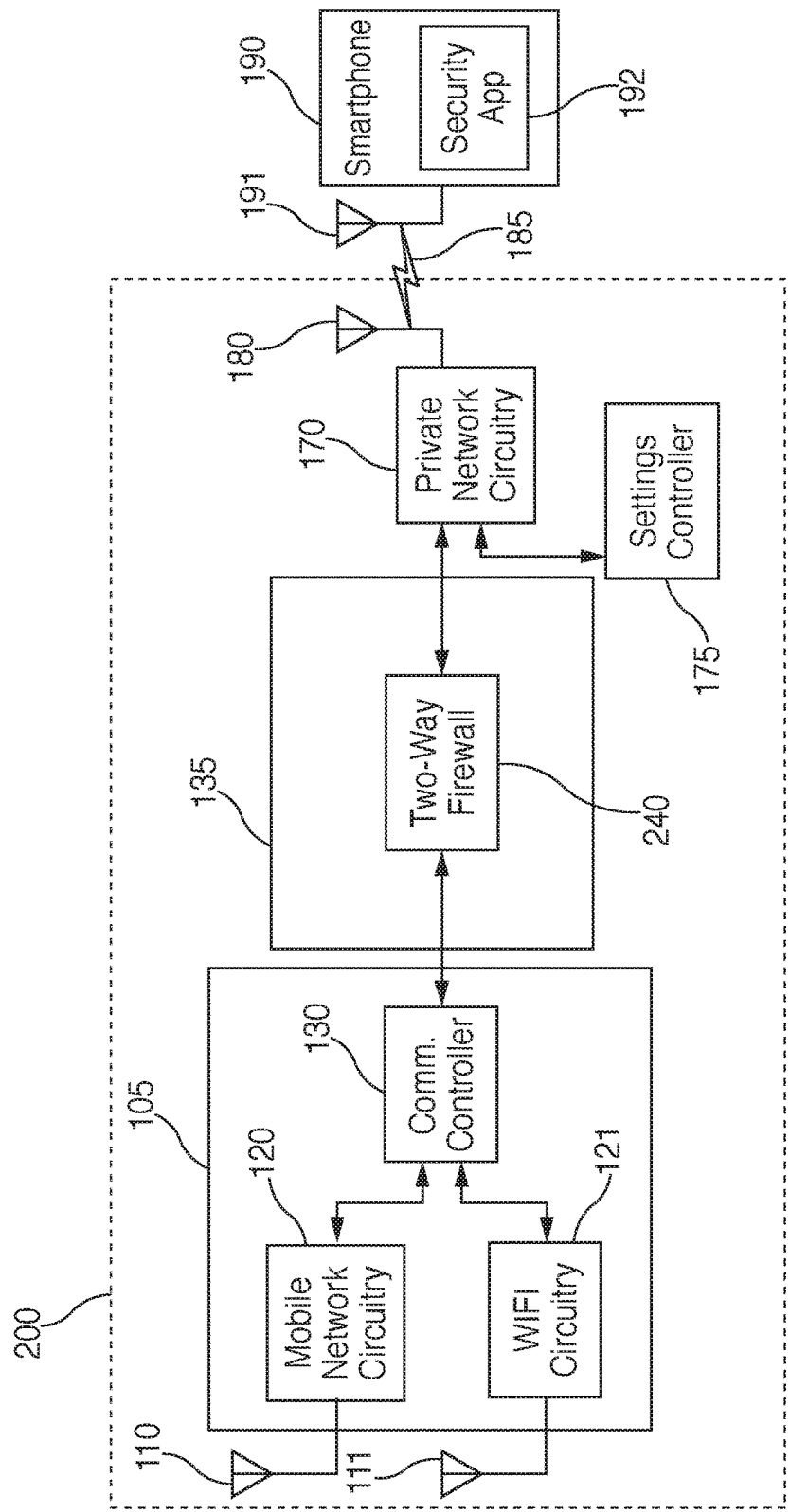
FIG. 2 is a block diagram of a second embodiment of a secure interface for a mobile communications device according to an aspect of the present disclosure.

Referring now to FIG. 2, a second embodiment of a secure interface 200 is shown in which a two-way firewall 240 replaces the output-side server/filter 140, output path one-way link 150, input path one-way link 151, and input-side server/filter 160. Two-way firewall 240 is configured with the in-bound filter criteria and out-bound filter criteria, and filters the externally-received information packets in the same manner as output-side server/filter 140 of the first embodiment and the internally-received information packets in the same manner as input-side server/filter 160 of the first embodiment.

Figure 3A:
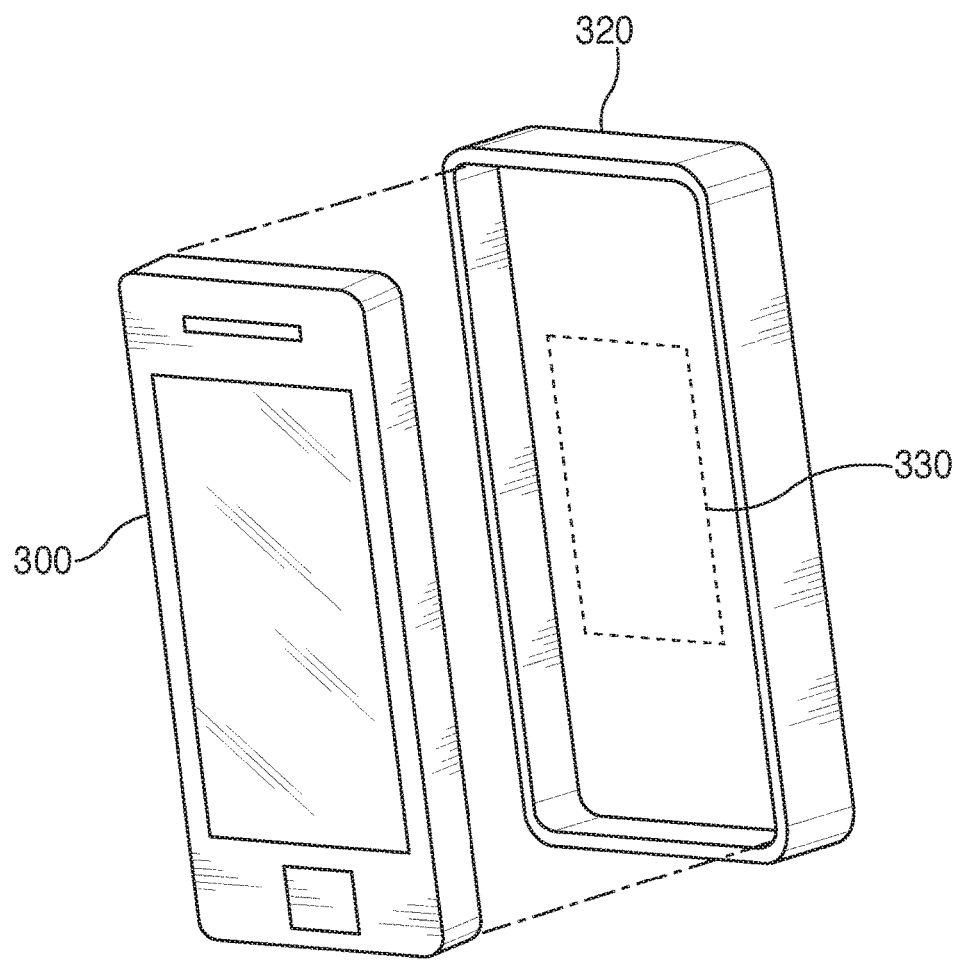
FIG. 3A is a diagram showing the secure interface as a clamshell-style phone case positioned adjacent to a mobile communications device according to an aspect of the present disclosure.
Figure 3B:
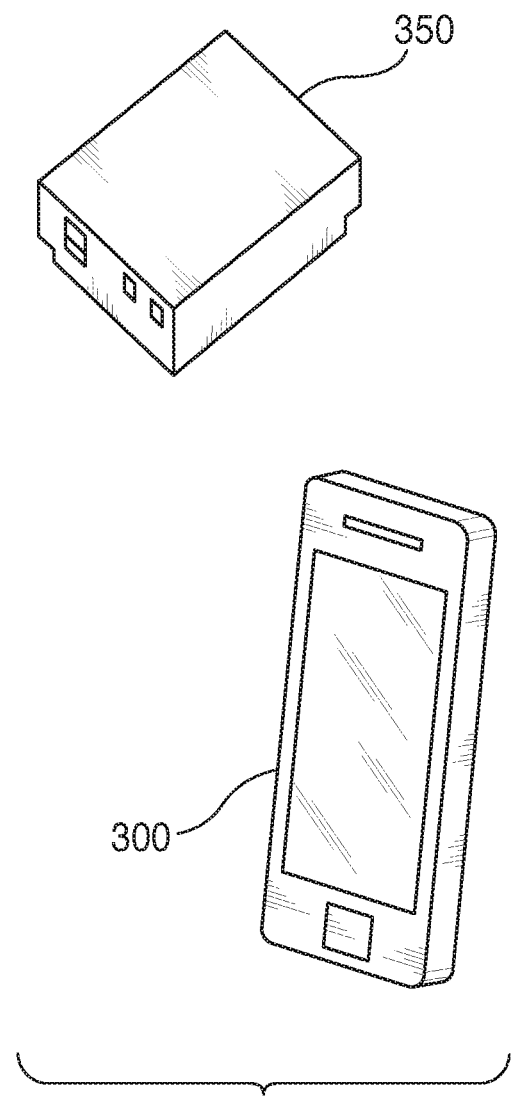
FIG. 3B is a diagram showing the secure interface as a mobile hotspot positioned adjacent to a mobile communications device according to another aspect of the present disclosure.

Referring now to FIG. 3A, secure interface 320 is shown as a clam-shell type case that can be directly mated to a smartphone 300. Alternatively, as shown in FIG. 3B, secure interface 350 may be mounted in an enclosure separate from smartphone 300 in a manner similarly to Wi-Fi hotspots.

Figure 4:
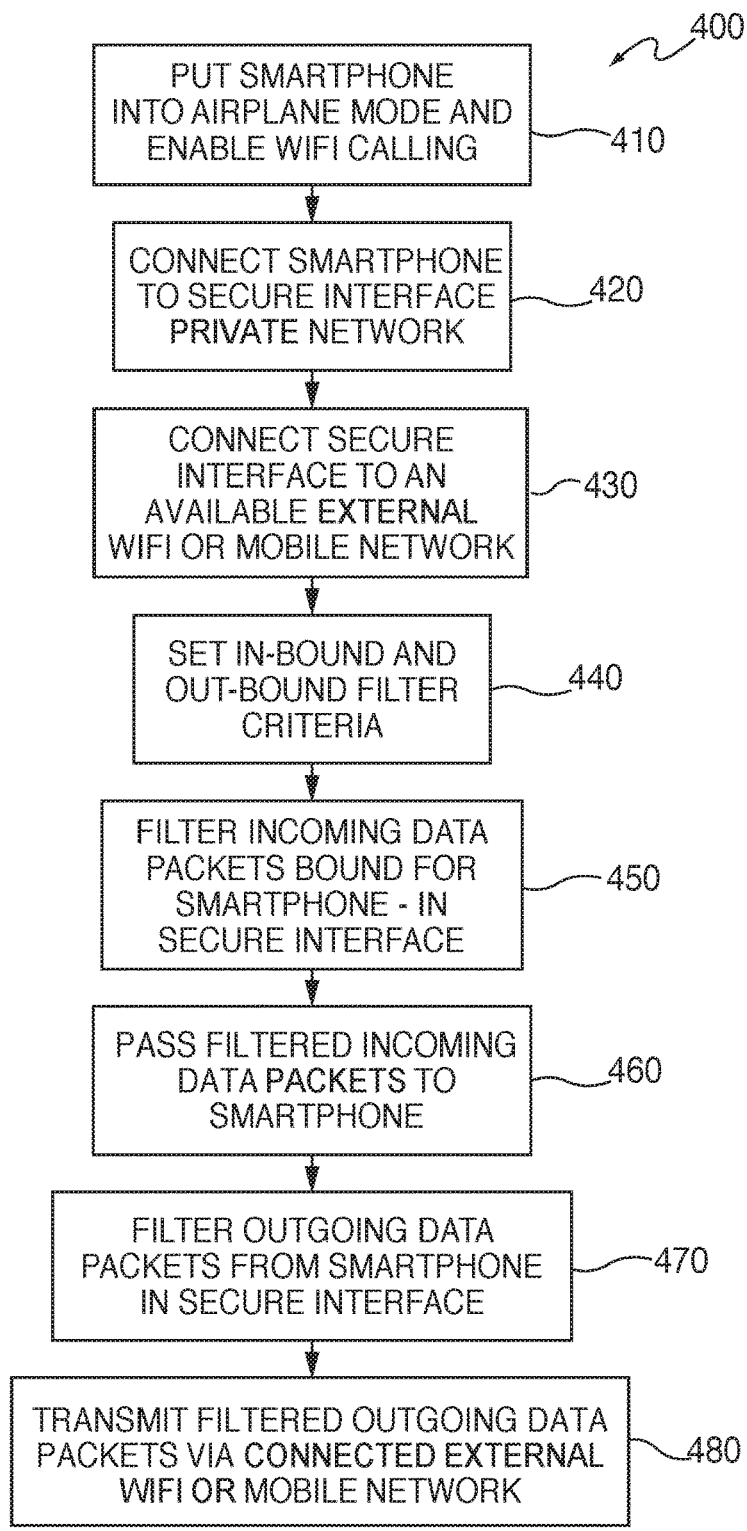
FIG. 4 is a flowchart of the operation of the secure interface of the present disclosure.

Referring now to FIG. 4, a flowchart 400 is shown detailing the operation of the secure interface 100, 200 of the present disclosure. First, at step 410, the smartphone 190 to be associated with the secure interface 100, 200 is placed into airplane mode (i.e., mobile network calling is disabled) and private network calling is enabled (e.g., Wi-Fi calling). Next, at step 420, the smartphone 190 is connected (for communication) with the private network 185 of the secure interface 100, 200 (e.g., a Wi-Fi network). Further, at step 430, the secure interface 100, 200 is connected to either the mobile network or an available (Wi-Fi network). This step is preferably performed via the security application 192 running on smartphone 190. Still further, at step 440, the in-bound filter criteria and out-bound filter criteria are set, preferably via the security application 192 running on smartphone 190. Once the secure interface 100, 200 is configure, the incoming data packets are filtered (based on the in-bound filter criteria) in the secure interface at step 450 and then the filtered incoming data packets are passed to smartphone 190 at step 460. Likewise, the outgoing data packets are filtered (based on the out-bound filter criteria) at step 470 and then at step 480 the filtered outgoing data packets are transmitted via either the mobile network or the Wi-Fi network (depending on the choice of network made at step 430).

The security interface of the present disclosure isolates the mobile communications device (e.g., smartphone) from the commercial mobile (cellular) or Wi-Fi networks. In addition, the security device may provide a protocol break so that the IP address and/or MAC address of the mobile communications device is not transferred across the one-way link to the commercial mobile (cellular) network. Because only data is transferred between the mobile communications device and the commercial mobile network, the security interface allows the identity of the mobile communications device to be hidden. The security interface of the present invention also provides a flexible dynamic filter that can be user-programmed to filter incoming and outgoing data streams based, inter alia, on source, destination, data type, and data content. Finally, the security interface of the present disclosure supports any mobile communications device that is capable of running an application (e.g., any IOS (iPhone Operating System) device or Android smartphone).

Although the present invention has been particularly shown and described with reference to the preferred embodiments and various aspects thereof, it will be appreciated by those of ordinary skill in the art that various changes and modifications may be made without departing from the spirit and scope of the invention. It is intended that the appended claims be interpreted as including the embodiments described herein, the alternatives mentioned above, and all equivalents thereto.

What is claimed is:

1. A secure interface for a mobile communications device, comprising:

output communications circuitry operable to communicate output communications with an external network, the output communications including externally-received information packets and to be externally-transmitted information packets, the output communications circuitry receiving the to be externally-transmitted information packets via an internal connection and transmitting the to be externally-transmitted information packets to the external network via an external connection and receiving the externally-received information packets from the external network via the external connection and passing the externally-received information packets via the internal connection;

private network communications circuitry operable to communicate private network communications with a mobile communications device, the private network communications including internally-received information packets and to be internally-transmitted information packets, the private network communications circuitry receiving the to be internally-transmitted information packets via an internal connection and transmitting the to be internally-transmitted information packets to the mobile communications device via an external connection and receiving the internally-received information packets from the mobile communications device via the external connection and passing the internally-received information packets via the internal connection; and an input/output filter connected between the output communications circuitry and the private network communications circuitry and configured to separately filter the externally-received information packets and the internally-received information packets to block any undesirable packets based on programmed stored criteria, to pass filtered externally-received information packets to the internal connection of the private network communications circuitry as the to be internally-transmitted information packets, and to pass filtered internally-received information packets to the internal connection of the output communications circuitry as the to be externally transmitted information packets.

2. The secure interface of claim 1, wherein the output communications circuitry comprises mobile network circuitry and a communications controller.

3. The secure interface of claim 1, wherein the output communications circuitry comprises Wi-Fi circuitry and a communications controller.

4. The secure interface of claim 3, wherein the communications controller stores configuration settings for the Wi-Fi circuitry.

5. The secure interface of claim 1, wherein the output communications circuitry comprises mobile network circuitry, Wi-Fi circuitry, and a communications controller.

6. The secure interface of claim 5, wherein the communications controller is configured to select one of the mobile network circuitry and Wi-Fi circuitry for use.

7. The secure interface of claim 1, wherein the input/output filter comprises:
an input path one-way link configured to pass information packets from an input thereof to an output thereof and to prevent any information or signals of any kind from passing from the output thereof to the input thereof; and
an output path one-way link configured to pass information packets from an input thereof to an output thereof and to prevent any information or signals of any kind from passing from the output thereof to the input thereof.

8. The secure interface of claim 7, wherein the input/output filter comprises an output server/filter having an output coupled to the input of the input path one-way link and an input coupled to the output of the output path one-way link, the output server/filter configured to forward information packets received on the input thereof to the output communications circuitry, to filter information packets received from the output communications circuitry based on first programmed stored criteria and to forward the filtered information packets on the output thereof.

9. The secure interface of claim 8, wherein the input/output filter comprises an input server/filter having an input coupled to the output of the input path one-way link and an output coupled to the input of the output path one-way link, the input server/filter configured to forward information packets received on the input thereof to the private network communications circuitry, to filter information packets received from the private network communications circuitry based on second programmed stored criteria and to forward the filtered information packets on the output thereof.

10. The secure interface of claim 9, wherein the output server/filter only receives information packets from the input server/filter via the output path one-way link.

11. The secure interface of claim 9, wherein the input server/filter only receives information packets from the output server/filter via the input path one-way link.

12. The secure interface of claim 1, wherein the input/output filter comprises a firewall having a first connection to the output communications circuitry and a second connection to the private network communications circuitry, the firewall configured to filter information packets received from the output communications circuitry based on first programmed stored criteria and to forward filtered information packets to the private network communications circuitry and to filter information packets received from the private network communications circuitry based on second programmed stored criteria and to forward the filtered information packets to the output communications circuitry.

13. The secure interface of claim 1, further comprising a settings controller operable to set programmed stored criteria and settings for the output communications circuitry and for the input/output filter.

14. The secure interface of claim 1, wherein the private network communications circuitry comprises circuits operable to communicate according to a secure personal network protocol.

15. The secure interface of claim 14, wherein the private network communications circuitry comprises circuits operable to communicate according to an Institute of Electrical and Electronics Engineers (IEEE) 802 standard.

16. The secure interface of claim 15, wherein the private network communications circuitry implements encrypted communications.

17. The secure interface of claim 1, wherein the mobile communications device is a smartphone and the output communications circuitry, the private network communications circuitry, and the input/output filter are mounted within a clam-shell type case that mates with the smartphone.

18. The secure interface of claim 1, wherein the output communications circuitry, the private network communications circuitry, and the input/output filter are mounted within an enclosure separate from the mobile communications device.

19. A method of providing a secure interface for a mobile communications device, comprising the steps of:
configuring a mobile communications device to disable communications with an external network and enabling communications with a private network;
communicatively connecting the mobile communications device to a private network generated by the secure interface;
communicatively connecting the secure interface to the external network;
setting criteria for inbound data packet filtering;
receiving inbound data packets via the external network;
filtering the inbound data packets to block any undesirable inbound data packets based on the criteria set for inbound data packet filtering; and
passing the filtered inbound data packets to the mobile communications device via the private network.

20. The method of claim 19, further comprising the steps of:
setting criteria for outbound packet filtering;
receiving outbound data packets from the mobile communications device via the private network;
filtering the outbound data packets to block any undesirable outbound data packets based on the criteria set for outbound packet filtering; and
passing filtered outbound data packets to the external network.

* * * * *